(12) United States Patent
Zamora et al.

(10) Patent No.: US 8,475,585 B2
(45) Date of Patent: Jul. 2, 2013

(54) STABLE FOAMED CEMENT SLURRY COMPOSITIONS AND METHODS FOR MAKING AND USING SAME

(71) Applicant: Clearwater International, LLC, Houston, TX (US)

(72) Inventors: Frank Zamora, Houston, TX (US); Marilyn J. Bramblett, Houston, TX (US); Sarkis R. Kakadjian, Houston, TX (US)

(73) Assignee: Clearwater International, LLC, Houston, TX (US)

( * ) Notice: Subject to any disclaimer, the term of this patent is extended or adjusted under 35 U.S.C. 154(b) by 0 days.

(21) Appl. No.: 13/648,532

(22) Filed: Oct. 10, 2012

(65) Prior Publication Data

US 2013/0046035 A1 Feb. 21, 2013

Related U.S. Application Data

(62) Division of application No. 12/240,987, filed on Sep. 29, 2008, now Pat. No. 8,287,640.

(51) Int. Cl.
| | | |
|---|---|---|
| *E21B 33/13* | (2006.01) |
| *E21B 43/27* | (2006.01) |
| *C04B 16/08* | (2006.01) |
| *C04B 20/00* | (2006.01) |
| *C04B 38/00* | (2006.01) |
| *C04B 7/32* | (2006.01) |
| *C04B 7/36* | (2006.01) |
| *C04B 9/11* | (2006.01) |
| *C04B 11/28* | (2006.01) |
| *C04B 28/06* | (2006.01) |

(52) U.S. Cl.
USPC ........... 106/677; 106/672; 106/696; 166/295; 166/294; 166/300

(58) Field of Classification Search
USPC .................. 106/672, 696, 677; 166/295, 294, 166/300
See application file for complete search history.

(56) References Cited

U.S. PATENT DOCUMENTS 7,191,834 B2 * 3/2007 Lewis et al. .................... 166/293

FOREIGN PATENT DOCUMENTS

JP 59109663 A * 6/1984

* cited by examiner

*Primary Examiner* — Kaj K Olsen
*Assistant Examiner* — Karam Hijji
(74) *Attorney, Agent, or Firm* — Robert W. Strozier

(57) ABSTRACT

A foamed cement composition is disclosed for utilization in performing a variety of well cementing operations, and to methods for making and using same. The foamed cement composition basically includes a cement, water sufficient to form a pumpable slurry, a gas sufficient to foam the slurry, a foaming agent and optionally a foam stabilizing agent.

12 Claims, No Drawings

STABLE FOAMED CEMENT SLURRY COMPOSITIONS AND METHODS FOR MAKING AND USING SAME

RELATED APPLICATION

This application is a divisional application and claims the benefit and priority to U.S. Ser. No. 12/240,987, filed 29 Sep. 2008, now U.S. Pat. No. 8,287,640, issued 16 Oct. 2012.

BACKGROUND OF THE INVENTION

1. Field of the Invention

The present invention relates to stable foamed cement slurries.

More particularly, the present invention relates to stable foamed cement slurries, where the slurries comprise a cement, a foaming system including an ionic foaming agent including a surfactant and an anionic polymer or a cationic polymer with or without a zwitterionic surfactant. The foamed cements of this invention have improved foam characteristics showing improvements from about 10% to about 80% at atmospheric pressure and produce foams stable at temperatures from room temperature to about 350° F.

2. Description of the Related Art

The use of foaming agents to provide lightweight cement compositions was first shown in U.S. Pat. No. 5,711,801 to Chatterji et. al., where the slurry density ranged from about 6 to about 16 pounds per gallon by adding 5% to 80% by volume of gas phase to form the resulting foamed composition. Subsequently, U.S. Pat. Nos. 5,897,699; 5,900,053; 5,966,693; 6,063,738; 6,227,294; 6,244,343; 6,336,505; 6,364,945; 6,367,550; 6,547,871; 6,797,054; 6,619,399; 6,955,294; 6,336,505; 6,953,505; 6,835,243; 7,008,477; 7,013,975; and 7,191,834 describe the use of foamer and foam stabilizer based surfactant systems like alpha-olefinic sulfonated, ethoxylated alcohol ether sulfate surfactant, alkyl or alkene amidopropyl betaine surfactant alkyl or alkene amidopropyl dimethyl amine oxide, hydrolyzed keratin, ammonium salt of an alkyl ether sulfate, cocamidopropyl hydroxysultaine, cocoamidopropyl dimethyloxide, capryl/capramido propyl betaine, capryl/capramido propyl dimethyl amine oxide. U.S. Pat. No. 6,235,809 disclosed the use of sodium polyacrylate and AMPS terpolymer to stabilize foamed cement systems.

Although a number of foamed cement compositions are well known, there is still a need in the art for additional foamed cement composition, especially compositions having improved foam characteristics.

SUMMARY OF THE INVENTION

The present invention provides compressible, lightweight, fast setting well cement compositions which set into high compressive strength substantially impermeable masses and methods of using such compositions in well completion and remedial operations. The compositions and methods are suitable for cementing in wells exhibiting a need for lightweight or lower density cement compositions which are capable of preventing pressurized formation liquid and/or gas influx into the cement compositions when setting. The cement compositions and methods are particularly suitable for carrying out primary cementing operations in deep wells as a result of the cement compositions being lightweight, having low fluid loss, having short transition times, being compressible and having good thermal insulation properties.

As will be described herein, the cement compositions of this invention are foamed with a gas and consequently have relatively low densities, i.e., densities in the range of from about 6 to about 16 pounds per gallon.

A further advantage of the cement compositions of this invention when used in primary cementing is that as a result of being foamed, the compositions are compressible. That is, when placed in an annulus to be cemented, a cement composition of this invention is compressed at a pressure above the pressure at which formation fluids flow into the annulus thereby increasing the resistance of the cement composition to formation fluid flow during its transition time. This characteristic is due to the compressed gas expanding to compensate for the cement compositions hydration and fluid loss volume reduction during setting. With the same reduction in volume, anon-compressible cement composition will greatly reduce in pressure where a compressible cement composition will remain at a relatively constant pressure until the cement composition sets thereby preventing water and/or gas from entering the annulus and flowing through the setting cement.

Another advantage of the cement compositions of the present invention is that as a result of being foamed, the compositions provide excellent thermal insulation between the well bore and a pipe cemented therein. A non-foamed cement composition typically has a thermal conductivity of 0.35 BTU/(hr*ft*° F.) where a foamed cement composition of the same density has a thermal conductivity of 0.15 BTU/(hr*ft*° F.). The applications of cement compositions that have low thermal conductivity include, but are not limited to, wells under steam injection or wells penetrating a perma-frost layer or gas-hydrate formation.

Yet another advantage of a foamed cement composition is that after setting, the dispersed gas in the set cement increases the ductility of the set cement as compared to non-foamed cements. Foamed cements have a Young's modulus of about $0.02 \times 10^6$ psi as compared to non-porous cements having a Young's modulus of about $2.5 \times 10^6$ psi.

The cement compositions of this invention are basically comprised of a cement, water or a water base fluid substitute for water present in an amount sufficient to form a pumpable slurry, a gas present in an amount sufficient to foam the slurry and produce a slurry density in the range of from about 6 to about 16 pounds per gallon, a foaming agent to facilitate foaming of the cement composition and, optionally, a foam stabilizing agent to maintain the cement composition in the foamed state during placement and setting.

The present invention provides stable foamed cement slurries, where the slurries comprise a cement, a foaming system including an ionic gel system. The ionic gel system comprises an ionic interaction between: (1) a cationic surfactant(s) and an anionic polymer/zwitterionic surfactant system(s) or (2) an anionic surfactant(s) and a cationic polymer/zwitterionic surfactant system(s). The resulting foamed cements have improved foam characteristics showing improvements between about 10% and about 80% at atmospheric pressure and produce foams stable at temperatures from room temperature up to about 350° F.

The present invention provides improved lightweight, fast setting well cement compositions and methods which meet the needs described above and overcome the shortcomings of the prior art. The cement compositions basically provide a slag cement, water or a water base fluid substitute for water present in the composition in an amount sufficient to form a pumpable slurry, a gas present in the composition in an amount sufficient to foam the slurry and produce a slurry density in the range of from about 6 to about 16 pounds per gallon, a foaming composition and a foam stabilizing agent.

The present invention provides a method for foaming a cement, where the method include the step of adding a foaming composition including an ionic gel system. The ionic gel system comprises an ionic interaction between: (1) a cationic surfactant(s) and an anionic polymer/zwitterionic surfactant system(s) or (2) an anionic surfactant(s) and a cationic polymer/zwitterionic surfactant system(s). Before, during or after the addition of the foaming composition, injecting a gas into the cement to form a foamed cement.

The present invention also provides a method including the step of placing a lightweight, fast setting compressible cement composition of this invention in a zone in a well to be cemented. The method also includes the step of maintaining the cement composition in the zone for a time sufficient for the cement composition to set into a high strength substantially impermeable mass therein.

DETAILED DESCRIPTION OF THE INVENTION

The inventors have found that a formulation of stabilized foamed cement can be prepared that produces a foamed cement having improved foam characteristics. The stabilized foamed cement includes a foaming system comprising an ionically bonded (or electrovalently bonded) product formed by an interaction of cationic polymers and/or anionic polymers with an oppositely charge foamer system. For an example of a foaming composition of this invention, the inventors have prepared foaming compositions including a solution of a cationic polymer such as a poly diallyl dimethyl ammonium chloride and an anionic foamer system such as sodium lauryl sulfate, where the cationic polymer and the anionic foamer interact to generate a coacervated gel system that impart high foam height and stability to a foamed cement slurry. The inventors have also found that the resulting foamed cement slurries can also include a stabilizing agent including a cocoamidopropyl betaine and a coco amine oxide adapted to further stabilize the cement foam structure and texture.

The present invention broadly relates to a foamed cement having improved foam characteristics, where the cement includes an oppositely charge polymer and foamer system to stabilize a generated foam. The cement can also include a stabilizing agent to further stabilize the generated foam. Only U.S. Pat. No. 6,364,945 even mentions the use of particulated crosslinked gel using hydroxyalkylcellulose grafted with vinyl phosphonic acid and crosslinked Bronsted-Lowry or Lewis base. This gel is subsequently degraded by oxidative and enzymatic means. The use of the gel system is to form permeable cement as a sand screen. However, in that system there is no interaction between the crosslinked particulated system and the foaming agent to stabilize the foamed cement slurry.

The present invention also broadly relates to a method for cementing a zone in a well basically comprise the steps of placing a lightweight fast setting well cement composition of this invention which sets into a high strength substantially impermeable mass in the subterranean zone to be cemented, and maintaining the cement composition in the zone for a time sufficient for the cement composition to set therein.

The cement market demands cement foams that are stable and this invention demonstrates that ionic bonded gels incorporated in the cement slurry creates foam stability.

Adding a viscosifier compatible with the cement and crosslinking the viscosifing agent will generate a stable foam at elevated temperature conditions. The novelty in this practice is the foamer is both crosslinker and foam generator.

The current products in the market use our normal based foamers with a natural additive as a stabilizer. Or product uses a better crosslinking system to provide the stabilized product that is synthetic.

As indicated above, our chemistry is different, or methodology is different, and the performance is superior.

Suitable Reagents

Cement

Suitable cements for use in this invention include, without limitation, all API classes of cements, other cements used in oil field applications, slag cements, or mixtures or combinations thereof.

Suitable slag cements useful in the practice of this invention include, without limitation, particulate slag, an activator such as lime and other additives such as a dispersant. The particulate slag is a granulated blast furnace byproduct formed in the production of cast iron, and is broadly comprised of the oxidized impurities found in iron ore. During the operation of a blast furnace to remove iron from iron ore, a molten waste product is formed. By preventing the molten product from crystallizing and thereby losing its energy of crystallization, a super cooled liquid or non-crystalline glassy material can be formed. The non-crystalline, glassy material, which has also been described as a vitreous substance free from crystalline materials as determined by X-ray diffraction analysis, is capable of exhibiting some hydraulic activity upon being reduced in size by grinding to a fine particle size in the range of from about 1 to about 100 microns.

Crystallization of the molten blast-furnace waste product is prevented and the super cooled glassy liquid is formed by rapidly chilling the molten waste. This rapid chilling can be affected by spraying the molten waste with streams of water which causes rapid solidification and the formation of a water slurry of small sand-like particles. The water is removed from the slurry and the remaining coarse particles are ground to a fine particle size having a Blaine fineness in the range of from about 5,000 to about 7,000, most preferably from about 5,200 to about 6,000 square centimeters per gram.

One or more activators are added to the slag which provide hydraulic activity to the slag at lower temperatures. Such activators include hydrated lime, $Ca(OH)_2$, sodium hydroxide, sodium sulfate, sodium carbonate, sodium silicate and Portland cement. The activator or activators used are combined with the particulate slag in an amount in the range of from about 0.5% to about 10% by weight of the slag.

In one embodiment, the slag cement for use in the present invention is comprised of particulate slag having a Blaine fineness of about 5,900 square centimeters per gram, sodium carbonate present in an amount of about 2% by weight of particulate slag and a dispersant present in an amount of about 1.4% by weight of slag.

Water

Suitable water for use in the cement compositions of this invention including, without limitation, water from any source provided it does not contain an excess of compounds which adversely react with or otherwise affect other components in the cement compositions. For example, the water can be fresh water, salt water, brines or seawater. Also, any available water base fluid which does not adversely react with components in the cement composition can be substituted for the water. For example, a water base well drilling fluid available at the well cite may be utilized either alone or in combination with water. In offshore applications, it is convenient to utilize seawater for forming the cement compositions. The water used is present in a cement composition of this invention in an amount sufficient to form a pumpable slurry of the slag cement. Generally, the water is present in the range of from about 20% to about 80% by weight of the slag cement in the composition.

Suitable gases for use in the foam cement slurry of this invention include, without limitation, nitrogen, air, or other oxygen-nitrogen gas mixtures, or any other gas that does not adversely affect cement formation or mixtures or combinations thereof. In certain embodiments, the gas used in the cements is nitrogen. Generally, the gas is present in an amount sufficient to foam the cement slurry and produce a slurry density in the range of from about 6 to about 16 pounds per gallon, i.e., an amount in the range of from about 5% to about 75% by volume of the resulting foamed composition.

Anionic Polymers

Suitable anionic polymers for use in the present invention include, without limitation, copolymers of acrylamide and acrylic acid, terpolymers of acrylamide-acrylic acid-AMPS, poly-/- glutamates, sodium polystyrene-sulfonates, potassium polystyrene-sulfonates, copolymers of methacrylamide and acrylic acid, copolymers of acrylamide and methacrylic acid, copolymers of methacrylamide and methacrylic acid, polymers including acrylamide, acrylic acid, methacrylamide and methacrylic acid, and mixture or combinations thereof.

Cationic Polymers

Suitable cationic polymers for use in the present invention include, without limitation, homo polymers of quaternary ammonium salts such as poly diallyl dimethyl ammonium chloride, copolymers of quaternary ammonium salts and acrylic amide, copolymers of quaternary ammonium salts and sulfur dioxide, block copolymers of quaternary ammonium salts and epichlorohidrine, cationic polyacrylamides, and mixtures or combinations thereof.

Surfactants

Suitable foaming agents for use in the invention include, without limitation, one or a mixture of cationic surfactants or one or a mixtures of anionic surfactants.

Suitable cationic surfactants include, without limitation, any cationic surfactant such as monocarbyl ammonium salts, dicarbyl ammonium salts, tricarbyl ammonium salts, monocarbyl phosphonium salts, dicarbyl phosphonium salts, tricarbyl phosphonium salts, carbylcarboxy salts, quaternary ammonium salts, imidazolines, ethoxylated amines, quaternary phospholipids, gemini, bis or di quaternary ammonium surfactants such as bis quaternary ammonium halides of bis halogenated ethane, propane, butane or higher halogenated alkanes, e.g., dichloroethane or dibromoethane, or bis halogenated ethers such as dichloroethylether (DCEE). Preferred bis quaternary ammonium halides are prepared from substituted dimethyl tertiary amines, where the substituent includes between about 4 and about 30 carbon atoms, preferably, between about 6 and about 24 carbon atoms, and particularly, between about 8 and about 24 carbon atoms, and where one or more of the carbon atoms can be replace by an oxygen atom in the form of an ether and/or hydroxyl moiety and/or a nitrogen atom is the form of an amido moiety. Particularly preferred bis quaternary ammonium halides hydrocarbons are prepared from naturally occurring acids, such as fatty acids, synthetic acids, modified naturally occurring acids, or mixture or combinations thereof. Preferred naturally occurring acids are those found in naturally occurring oils such as coconut oil, palm oil, palm kernel oil, soya, safflower oil, sunflower oil, peanut oil, canola oil, or from animal such as tallow oil and its derivatives. Preferred bis quaternary ammonium halides are prepared from disubstituted methyltertiaryamines, where the substituents include between about 4 and about 30 carbon atoms, preferably, between about 6 and about 24 carbon atoms, and particularly, between about 8 and about 24 carbon atoms, and where one or more of the carbon atoms can be replace by an oxygen atom in the form of an ether and/or hydroxyl moiety and/or a nitrogen atom is the form of an amido moiety, such as amidopropyltertiary amines, derived from the reaction of dimethyl aminopropylamine (DMAPA) or similar terminated primary-tertiary diamines, reacted with the above mentioned oils or their corresponding fatty acids, or hydroxy acids. Other preferred cationic surfactants are dimer acids or anhydrides including alkylsubstituted maleic anhydride, alkylsubstituted diethylmalonic acid, or alkylsubstituted higher diacids such as azelaic acid (C9), trimer acids as NTA (nitriloacetic acid), and aconitic acid and trimetellic anhydride are useful though producting a higher trimer. the tertiary amine may be accomplished by reaction of a diamine with a fatty acid or oil, reacting with one amine and then converting the other primary amine to tertiary by the addition of tetrahydrofuran, ethylene oxide, propylene oxide, butylene oxide, epichlorohydrin, or the like and further where the terminal hydrogens of the primary amine can be alkylated using formaldehyde/formic acid mixtures.

Suitable anionic surfactants include, without limitation, anionic sulfate surfactant, alkyl ether sulfonates, alkylaryl sulfonates, or mixture or combinations. Exemplary examples of sodium, ammonium or potassium sulfate surfactants include those having the general formula $R^1—SO_3^-X^+$, where $X^+$ is selected from the group consisting of $Na^+$, $K^+$, $NH_4^+$, or mixtures or combinations thereof, $R^1$ is a carbon-containing group including an alkyl group, an aryl group, an alkaryl group, an aralkyl group or mixture thereof. In certain embodiments, the anionic surfactants include sodium, ammonium or potassium surfactants include short chain sodium, ammonium or potassium sulfate surfactants having between 2 and about 20 carbon atoms, especially, between about 4 and 18 carbon atoms and more particularly, between about 12 and about 18 carbon atoms.

Preferred alkylaryl sulfonates including, without limitation, alkyl benzene sulfonic acids and their salts, dialkylbenzene disulfonic acids and their salts, dialkylbenzene sulfonic acids and their salts, alkyltoluene/alkyl xylene sulfonic acids and their salts, alkylnaphthalene sulfonic acids/condensed alkyl naphthalene sulfonic acids and their salts, alkylphenol sulfonic acids/condensed alkylphenol sulfonic acids and their salts, or mixture or combinations thereof.

Preferred alkyl ether sulfonates including, without limitation, alkyl ether sulfonates having the general formula $R^2[—(O—R^3O)m-(R^4O)n-(R^5)]_y$, where: $R^2$=alkyl, alkenyl, amine, alkylamine, dialkylamine, trialkylamine, aromatic, polyaromatic, cycloalkane, cycloalkene, $R^3$, $R^4$=$C_2H_4$ or $C_3H_6$ or $C_4H_8$, $R^4$=linear or branched $C_7H_{14}SO_3X$ to $C_{30}H_{60}SO_3X$ when y=1, $R^5$=linear or branched $C_7H_{14}SO_3X$ to $C_{30}H_{60}SO_3X$ or H when y>1 but at least one $R^4$ must be linear or branched $C_7H_{14}SO_3X$ to $C_{30}H_{60}SO_3X$, M is greater or equal to 1, n is greater or equal to 0, n+m=1 to 30+, y is greater or equal to 1, X=alkali metal or alkaline earth metal or ammonium or amine.

In other embodiments, the anionic surfactants are sodium salt of alpha-olefinic sulfonic acids (AOS), which are mixtures of compounds of the formulas:

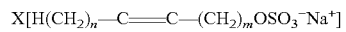

and

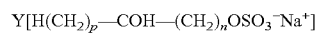

wherein n and m are individually integers in the range of from about 6 to about 16; p and q are individually integers in the range of from about 7 to about 17; and X and Y are fractions and the sum of X and Y is 1 and mixtures or combinations thereof.

In other embodiments, the anionic surfactants have are alcohol ether sulfates of the formula:

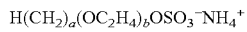

wherein a is an integer in the range of from about 6 to about 10; and b is an integer in the range of from about 3 to about 10 and mixtures or combinations thereof.

In other embodiments, the foaming agent is sodium lauryl sulfate.

The particular foaming agent employed will depend on various factors such as the types of formations in which the foamed cement is to be placed, etc. Generally, the foaming agent utilized is included in a cement composition of this invention in an amount in the range of from about 0.5% to about 10% by weight of water in the composition. When the foaming agent is one of the preferred surfactants described above, it is included in the composition in an amount in the range of from about 0.5% to about 5% by weight of water therein.

Stabilizing Agents

Suitable stabilizing agents for use in the foamed cements of this invention include, without limitation, zwitterionic compounds, amine oxides, alkylated polyalkylene oxides, or mixture or combinations thereof.

Suitable zwitterionic compounds include, without limitation: (1) any compound having the general structure $R^6, R^7, R^8N^+$—$R^9$— $CO_2^-$, where $R^6$, $R^7$, and $R^8$ are the same or different carbon-containing group, amido carbon-containing group, ether carbon-containing group, or mixtures thereof, and $R^9$ is an alkenyl group, alkenyloxide group or mixtures thereof; (2) any compound having the general structure $R^{10}(R^7, R^8N^+$—$R^9$— $CO_2^-)_n$, where $R^7$ and $R^8$ are the same or different carbon-containing group, amido carbon-containing group, ether carbon-containing group, or mixtures thereof, $R^9$ is an alkenyl group, alkenyloxide group or mixtures thereof, and $R^{10}$ is a multivalent substituent having a valency n between 2 and about 6, e.g., $CH_2$ moiety when n is 2, a CH moiety when n is 3 and a C atom when n is 4; (3) any compound having the general structure $R^{12}$—C(O)—N$(R^{11})$—$R^{13}$—$N^+(R^7, R^8)$—$R^9$—$CO_2^-$, where $R^7, R^8, R^{11}$ and $R^{12}$ are the same or different carbon-containing group, amido carbon-containing group, ether carbon-containing group, or mixtures thereof, and $R^9$ and $R^{13}$ are the same or different alkenyl group, alkenyloxide group or mixtures thereof; (4) any compound having the general structure $R^{14}$—$[R^{15}$—C(O)—N$(R^{11})$—$R^{13}$—$N^+(R^7, R^8)$—$R^9$—$CO_2^-]_m$, where $R^7, R^8$ and $R^{11}$ are the same or different carbon-containing group, amido carbon-containing group, ether carbon-containing group, or mixtures thereof, $R^9$, $R^{13}$ and $R^{15}$ are the same or different alkenyl group, alkenyloxide group or mixtures thereof and $R^{14}$ is a multivalent substituent having a valency m between 2 and about 6; other similar ammonium acid zwitterionic agent; or mixtures or combinations thereof. Preferred zwitterionic compounds are betaines such as cocamidopropyl betaine, 5-(1-piperidinomethyl)-1H-tetrazolide, or similar zwitterionic compounds. Other zwitterionic compounds for use in this invention include, without limitation, phospholipids capable of assuming a zwitterionic state such as phosphatidylcholine, phosphatidylserine, phosphatidylethanolamine, sphingomyelin and other ceramides, as well as various other zwitterionic phospholipids. Preferred sulfo-betaines and related zwitterionic compounds include, without limitation, N-Decyl-N,N-dimethyl-3-ammonio-1-propanesulfonate; Dimethylbenzyl-(3-sulfopropyl)ammonium; Dimethylethyl-(3-sulfopropyl)ammonium; Dimethyl-(2-hydroxyethyl)-(3-sulfopropyl)ammonium; 4-n-Hexylbenzoylamido-propyl-dimethylammoniosulfobetaine; -Methyl-N-(3-sulfopropyl)morpholinium; 4-n-Octylbenzoylamido-propyl-dimethylammoniosulfobetaine; 1-(3-Sulfopropyl) pyridium; N-Tetradecyl-N,N-Dimethyl-3-Ammonio-1-Propanesulfonate, or the like or mixtures or combination thereof.

In certain embodiments, the zwitterionic compounds have the formula:

wherein R is a $C_{10}$ to $C_{18}$ saturated aliphatic hydrocarbon group or an oleyl group or a linoleyl group and mixtures or combinations thereof.

In other embodiments, the zwitterionic compound has formula:

wherein R is a coco radical.

Suitable amine oxide for use in the present invention include, without limitation, compounds of the formula:

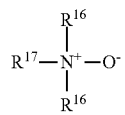

wherein the $R^{16}$ groups are independently selected from $C_1$ to $C_4$ carbyl groups, where one or more of the carbon atoms can be substituted with an O, atom, a S atom, CONR group, or other atom or group that has hydrophobic character and where one or more of the hydrogen atoms can be replaced with a halogen atom or groups with hydrogen like character, where R is an alkyl group, and the $R^{17}$ group is a branched $C_{11}$ to $C_{16}$ carbyl group, where one or more of the carbon atoms can be substituted with an O, atom, a S atom, CONR group, or other atom or group that has hydrophobic character and where one or more of the hydrogen atoms can be replaced with a halogen atom or groups with hydrogen like character, where R is an alkyl group. In certain embodiments, the $R^{16}$ groups are methyl, ethyl, and hydroxyethyl groups. In other embodiments, the $R^{16}$ groups are methyl group. In certain embodiments, the $R^{17}$, group is a $C_{12}$ to a $C_{1-3}$ carbyl group, where one or more of the carbon atoms can be substituted with an O, atom, a S atom, CONR group, or other atom or group that has hydrophobic character and where one or more of the hydrogen atoms can be replaced with a halogen atom or groups with hydrogen like character, where R is an alkyl group.

Exemplary examples of the amine oxides for use in the formulations of the present invention include cocoamine oxide, isononyldimethylamine oxide, isododecyldimethylamine oxide, isotridecyldimethylamine oxide, n-decyldimethylamine oxide, n-dodecyldimethylamine oxide, and mixtures or combinations thereof.

When a foam stabilizing agent is utilized, it is included in a cement composition of this invention in an amount in the range of from about 0.01% to about 5% by weight of water utilized. When the foam stabilizing agent is one of the particularly preferred agents described above, it is preferably present in the composition in an amount in the range of from about 1% to about 2% by weight of water.

As will be understood by those skilled in the art, the cement compositions of this invention can include a variety of known additives for achieving desired properties and results such as set retarding additives, fluid loss control additives, weighting additives and the like.

EXPERIMENTS OF THE INVENTION

In order to further illustrate the compositions and methods of this invention, the following examples are given.

In the formulation set forth below, the following additives comprise the foam system and foam stability system.

Additive A including the following ingredients.

| Ingredient | Amount |
|---|---|
| pDADMAC | 16.5 wt. % |
| cocoamidopropyl betaine | 2.63 wt. % |
| coco amine oxide | 3.46 wt. % |
| deionized water | 77.41 wt. % |

Additive B includes 25.0% w/w SDS (sodium dodecyl sulfate) in deionized water.

Example 1

This example illustrations an embodiment of a formulation of a foamed cement of this invention using a foam composition including sodium dodecyl sulfate (SDS), pDADMAC, cocoamidopropyl betaine, and coco amine oxide.

Formulation

The formulation included:

| Ingredient | Amount |
|---|---|
| Distilled Water | 104 g |
| Class H cement | 225 g |
| Additive A | 1.04 g (1.0% w/w) |
| Additive B | 2.60 g (2.5% w/w) |

The ingredients were added together in the above order and mixed in a Waring Blender until thoroughly mixed.

Measure Stability

The thoroughly mixed composition was then poured into volumetric cylinder to 250 mL mark and set static at room temperature. The following static results were obtained:

| Hours | Observation |
|---|---|
| 1 | volume stable (no observed drainage) |
| 2 | volume stable (no observed drainage) |
| 65 | volume stable (no observed drainage) |

This example illustrations another embodiment of a formulation of a foamed cement of this invention using a foam composition including sodium dodecyl sulfate (SDS), pDADMAC, cocoamidopropyl betaine, and coco amine oxide.

Example 2

This example illustrations an embodiment of a formulation of a foamed cement of this invention using a foam composition including sodium dodecyl sulfate (SDS), pDADMAC, cocoamidopropyl betaine, and coco amine oxide.

Formulation

The formulation included:

| Ingredient | Amount |
|---|---|
| Distilled Water | 138 g. |
| Class H cement | 300 g. |
| Additive A | 1.38 g. (1.0% w/w) |
| Additive B | 3.45 g. (2.5% w/w) |

The ingredients were added together in the above order and mixed in a Waring Blender until thoroughly mixed.

Measure Relative Density

Cubes of the composition of Example 2 were cured at room temperature in an atmospheric water bath. The density for 2 weighed cubes was determined using Archimedes Principle.

| Cube | Relative Density |
|---|---|
| 1 | 1.19 |
| 2 | 1.07 |

Compressive Strength

The compressive strength of cube 1 measured using the crush method was found to be 361 psic.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:
1. A foamed, gelled cement composition comprising:
a foamable composition including:
  a cement,
  a water-based fluid present in an amount between about 20 wt. % and about 80 wt. % based on the weight of the cement,
  a foaming composition comprising (1) a first additive composition including (a) a charged polymer, (b) a stabilizing agent, and (c) a water and (2) a second additive composition comprising an oppositely charged surfactant present in an amount between about 0.05 wt. % and about 10 wt. % of the water-based fluid to form a pre-foamed, gelled slurry including an ionic gel system comprising the charged polymer ionically bonded to the oppositely charged surfactant, and
a gas present in an amount between about 5 vol. % and about 85 vol. % based on the pre-foamed, gelled slurry to form the foamed, gelled cement composition, where the foamed, gelled cement composition is stable at temperatures from room temperature up to about 350° F. for a period of time sufficient for cement placement and cement setting and where the foamed, gelled cement composition is compressible prior to setting.
2. The composition of claim 1, wherein the cement is selected from the group consisting of API class cements, cements used for oil field applications, slag cements, and mixtures or combinations thereof.
3. The composition of claim 1, wherein the water is selected from the group comprising fresh water, salt water, brines, seawater, and mixtures or combinations thereof.

4. The composition of claim 1, wherein the gas is selected from the group consisting of nitrogen, air, other nitrogen-oxygen mixtures, and mixtures or combinations thereof.

5. The composition of claim 1, wherein the foamed, gelled cement composition has a density between about 6 and about 16 pounds per gallon.

6. The composition of claim 1, wherein the ionic gel system comprises (1) a cationic surfactant or a plurality of cationic surfactants and an anionic polymer or a plurality of anionic polymers, or (2) an anionic surfactant or a plurality of anionic surfactants and a cationic polymer or a plurality of cationic polymers, or (3) mixtures or combinations thereof.

7. The composition of claim 1, further comprising a dispersant present in an amount between about 1.0% and about 2.5% by weight of the cement.

8. The composition of claim 1, further comprising an activator selected from the group consisting of hydrated lime, $Ca(OH)_2$, sodium hydroxide, sodium sulfate, sodium carbonate, sodium silicate, Portland cement and mixtures or combinations thereof.

9. The composition of claim 8, wherein the activator is present in an amount between about 0.5% and about 10% by weight of the slag cement.

10. The composition of claim 1, wherein the stabilizing agent is present in an amount between about 0.01% and about 5% by weight of fluid in the composition.

11. The composition of claim 10, wherein the stabilizing agent is selected from the group consisting of zwitterionic compounds, amine oxides, alkylated polyalkylene oxides, or mixture or combinations thereof.

12. The composition of claim 11, wherein the stabilizing agent is present in an amount between about 1 wt. % and about 2 wt. % based on the composition.

\* \* \* \* \*